US005603978A

United States Patent [19]
White et al.

[11] Patent Number: 5,603,978
[45] Date of Patent: *Feb. 18, 1997

[54] ESTERIFIED PROPYLENE OXIDE-EXTENDED GLYCEROLS USEFUL AS FAT SUBSTITUTES

[75] Inventors: John F. White, Summit, N.J.; Michael R. Pollard, Dublin, Calif.

[73] Assignee: Arco Chemical Technology, L.P., Greenville, Del.

[*] Notice: The term of this patent shall not extend beyond the expiration date of Pat. No. 4,861,613.

[21] Appl. No.: 476,815

[22] Filed: Jun. 7, 1995

Related U.S. Application Data

[63] Continuation of Ser. No. 944,708, Sep. 10, 1992, abandoned, which is a continuation of Ser. No. 827,478, Jan. 27, 1992, abandoned, which is a continuation of Ser. No. 173,849, Mar. 28, 1988, abandoned, which is a division of Ser. No. 889,552, Jul. 25, 1986, Pat. No. 4,861,613.

[51] Int. Cl.$^6$ .................. A23D 3/00; A23D 5/00
[52] U.S. Cl. .......... 426/611; 426/601; 426/602; 426/603; 426/605; 426/804; 436/71; 554/227
[58] Field of Search .............. 536/115; 426/611, 426/671, 804, 601–605; 260/410, 410.6; 436/71; 554/227

[56] References Cited

U.S. PATENT DOCUMENTS

| | | | |
|---|---|---|---|
| 3,337,595 | 8/1967 | Lamont | 260/410.6 |
| 4,687,843 | 3/1987 | Smolin et al. | 536/18.3 |
| 4,849,242 | 7/1989 | Kershner | 426/601 |
| 4,861,613 | 8/1989 | White et al. | 426/611 |

FOREIGN PATENT DOCUMENTS

| | | |
|---|---|---|
| 660601 | 7/1965 | Belgium . |
| 1595369 | 12/1966 | Germany . |
| 207070 | 4/1982 | Germany . |
| 53-151050 | 12/1978 | Japan . |
| 55-160710 | 12/1980 | Japan . |
| 2129004 | 10/1983 | United Kingdom . |

OTHER PUBLICATIONS

L. G. Mieth et al., "Orientation Studies on the Metabolism of Various Acaloric Compounds with Fat–Like Properties In the Rat", vol. 32, No. 1, pp. 49–57, 1988 *Die Nahrung*.

Mieth et al., "Acaloric Compounds with Fat–Like Functional Properties", *Die Nahrung*, vol. 27, No. 9, pp. 853–876, 1983.

"Food Science" Third Edition, 1978, by N. N. Potter, pp. 478–482.

*Primary Examiner*—Gary L. Kunz
*Attorney, Agent, or Firm*—Stephen D. Harper

[57] ABSTRACT

Low calorie food compositions containing fat-type organoleptic ingredients and non-fat ingredients, wherein natural fats and synthetic fat mimetics are blended in proportion to provide any predetermined amount of fat caloric value, said synthetic fat-type mimetic ingredients comprising esterified epoxide-extended polyols (EEEPs) of the formula $P(OH)_{a+c}(EPO)_n(FE)_b$ where P is a polyol having $a=2$–8 primary hydroxyls, $c=0$–8 secondary and tertiary hydroxyls, $a+c$ is in the range of 3–8, EPO is a $C_3$–$C_6$ epoxide, FE is a fatty acid acyl moiety, n is the minimum epoxylation index average number having a value generally equal to or greater than a and is a number sufficient that greater than 95% of the primary hydroxyls of the polyol are converted to secondary or tertiary hydroxyls, and $2<b\leq a+c$. The EEEP's have general use as non-digestable fat substitutes having non-caloric food values, good organoleptic characteristics (mouth feel), are substantially resistant to intestinal absorption, do not appreciably hydrolyze in the digestive tract, and have characteristics similar to vegetable oils and fats. Suitable polyols include sugars, glycerides or saccharides which are reacted (etherified) with $C_3$–$C_6$ epoxides such as propylene oxide, butylene oxide, isobutylene oxide, pentene oxide, and the like to produce epoxide-extended polyols (EEPs) having an epoxylation index number, n, generally in the range of 2–8 and then acylated with $C_{8-24}$ fatty acids. Best mode examples are acylated propoxylated glycerol compound mixtures (APGs) which are resistant to pancreatic lipase in vitro, and feeding studies show them to be suitably resistant to overall digestion.

14 Claims, No Drawings

ESTERIFIED PROPYLENE OXIDE-EXTENDED GLYCEROLS USEFUL AS FAT SUBSTITUTES

This is a continuation of application Ser. No. 07/944,708, filed Sep. 10, 1992, now abandoned which is a continuation of application Ser. No. 07/827,478, filed Jan. 27, 1992, abandoned, which is a continuation of application Ser. No. 173,849, filed Mar 28, 1988, abandoned, which is a division of application Ser. No. 889,552, filed Jul. 25, 1986, now U.S. Pat. No. 4,861,613.

FIELD

This invention relates to esterified epoxide-extended polyols (EEEPs), methods of preparation thereof, and their use as non-digestible, non-caloric fat substitutes (fat mimetics) for cooking and in food compositions. The EEEPs have good organoleptic characteristics, have acceptable levels of resistance to overall digestibility as measured by rat feeding studies. More particularly, the invention relates to acylated epoxylated glycerol compound mixtures (APGs) of the formula $[P(OH)_{a+c}(EPO)_n(FE)_b]$, where P is a polyol having $a=2-8$ primary hydroxyls, and $c=0-8$ secondary plus tertiary hydroxyls, with $a+c$ being in the range of 3–8, EPO is a $C_3-C_6$ epoxide, FE is a fatty acid acyl moiety, n is the minimum epoxylation index average number having a value generally equal to or greater than a and is a number sufficient that greater than 95% of the primary hydroxyls of the polyol are converted to secondary or tertiary hydroxyls, and $2<b \leq a+c$, which are resistant to hydrolysis by pancreatic lipase. The resultant EEEPs may have physical properties ranging from a liquid oil, through fats and greases. They are useful in food formulations and cooking as they have good mouth feel and characteristics similar to vegetable oils and fats. Being relatively non-absorbable, non-digestible, and non-toxic they may be substituted for natural or processed oils and fats, but have low caloric value.

BACKGROUND

The accumulation of medical evidence in recent years regarding the adverse health implications of high fat diets, principally heart attacks, atheriosclerosis and overweight, has caused consumers to become extremely concerned about their diets. It is estimated that between 70–80% of U.S. adult females follow a weight reducing diet at least once a year. Men are also concerned about their weight and cholesterol levels. The concerns of both men and women have given rise to diet fads, diet drinks especially in the soft drink, wine and beer industry, and exercise programs and health clubs.

Common obesity is one of the most prevelant metabolic problems among people today. Fats and oils are necessary for balanced nutrition. However, the average consumer simply consumes more than is needed for proper nutrition. Fat, at 9 calories per gram, as compared to 4 calories per gram for carbohydrates or proteins, is the most concentrated dietary energy form. It is estimated that fat constitutes about 40% of the total calories in the typical western diet. Fats are consumed directly in meats, spreads, salad oils, and in natural produce such as nuts and avocados. Fats and oils are consumed as a result of absorption or incorporation in the foods during baking and frying. The vast increase in consumption of fast foods is a major contributor to the increase in the amount of dietary fat since fast foods rely extensively on frying processes employing fats and oils. In addition, the snack food industry uses large amounts of fats and oils in the production of potato chips, corn chips and other snack items. For example, in 1981 the USDA estimated approximately 12 billion pounds of fat and oil were used in edible products, predominately baking, frying fats, margarine, salad oil and/or cooking oil.

There is thus a clear indication that there is an enormous potential health food market for a fat substitute or fat mimetic that is either entirely non-digestible, or has reduced caloric value. Many nutritionists believe that Americans typically rely on fats for too large a proportion of calories in their diet. The National Research Council, for example, has recommended that Americans reduce the proportion of their dietary calories coming from fats from 40% to at least 30%. Replacement of fats in the diet with non-caloric substitutes is a more efficient way of reducing caloric intake than replacing sugar or carbohydrates because gram for gram, the substitution of non-caloric fat substitutes is more than twice as effective as reducing carbohydrate content with such things as saccharine or Nutra-sweet.

One of the difficulties in eliminating fat from the diet is the fact that fats and oils are all-pervasive in food products. In part, this is because they play an important role in the organoleptic acceptability of food products. For a fat substitute to be acceptable, it must be non-digestible, that is, not hydrolyzed in the digestive tract. In addition, it should not be directly absorbed through the intestinal wall. While some types of fat substitutes may be non-digestible, they are not of sufficiently high molecular weight to prevent them from being absorbed through the intestinal wall. The threshold molecular weight of non-absorbability for lipophilic molecules appears to be about 600.

In addition, the fat substitute must itself be non-toxic at high levels of ingestion. It must contain no toxic residues or impurities. To the extent that a fat substitute may be partially hydrolyzed in the digestive tract, any hydrolysis products must be non-toxic and/or metabolizable. If metabolizable, they should have very low caloric value. In general, fat substitutes must be without any serious medical side affects.

The fat substitutes must also have good organoleptic qualities of mouth feel and have no taste. In addition, fat substitutes must have appropriate physical properties for use in food compositions. That is, they should be liquids or solids depending on whether they are used as oil or shortening substitutes, and where used for cooking, must be thermally stable. While certain polysaccharide gums have been used as thickening agents, bulking agents or fillers in low-calorie foods, they can give a product a "slimy" mouth feel and are unsuitable for cooking as they have no thermal stability.

Acceptable synthetic fats would be added in large quantities (30–60%) to salad oils, cooking oils, margarines, butter blends, mayonnaise, shortenings and the like to create a new class of low-calorie products. While "low calorie" mayonnaise and salad dressings are presently available, the reduction in calories is achieved by increasing the water content with a corresponding loss in the organoleptically "rich" taste of such products.

A current review of the field is found in a feature article entitled "*Getting The Fat Out-Researchers Seek Substitutes For Full-Fat Fat*" *JAOCS, Vol.* 63, No. 3, (March 1986) pp. 278–286, 288.

One prior art proposed fat substitute is sucrose polyester (SPE), shown in U.S. Pat. Nos. 3,600,186 (Matson, et al. 1971), 3,251,827 (Scheil et al.) and 3,963,699 (Rizzi, et al., 1976). The SPEs are produced by the reaction of a monosaccharide, disaccharide or sugar alcohol having a minimum of four hydroxyl groups with fatty acids having from 8–22 carbon atoms. It was reported in "Chemical and Engineering News" (Jul. 26, 1982, page 32) that incorporating SPE as a partial replacement of the fats in the diets of ten obese patients dropped their caloric intake while satisfying their perceived need for fats. An additional benefit was the lowering of serum cholesterol, low density lipo-protein and triglycerides, all of which have been implicated in artery hardening diseases. However, SPE has the serious disadvantage of causing diarrhea, and plasma vitamin A and vitamin E levels are decreased.

The process for production of SPE is basically a methanolysis followed by esterification and extraction. The SPE process requires long reaction time with alternating additions of fresh transesterification catalyst and excess methyl soybean fatty acid ester ($RCO_2Me$). Temperature control is critical because sucrose will char at its melting point of 185° C. Further, in order to solubilize sucrose in the esterification solution, it must be added slowly as a micron-sized powder (produced by reduction of sucrose crystals in a hammermill) to a solution of $RCO_2Me$ containing half as much alkali metal soap as sucrose. After the sucrose is partially esterified, excess $RCO_2Me$ is added and the mixture heated at 145° C. for 8–12 hours. The fatty ester starting material, $RCO_2Me$, is not made in a continous process. Rather, it is made in a batch process and must be washed with water to recover all the glycerol. Commercial cane sugar must be reduced to a consistency of fine talcum powder, on the order of 50 microns or below in order to promote its dissolution in the reaction solution. Two stage addition of $RCO_2Me$ is necessary to prevent disproportionation to sucrose, which will char, and sucrose higher esters. For each pound of SPE made, one pound of $RCO_2Me$ must be cleaned up and recycled. Because a large excess of $RCO_2Me$ is used, the isolation of SPE is a complex process necessitating liquid-liquid extractions at OC with methanol or ethanol to remove unreacted $RCO_2Me$. A final extraction with hexane and clay bleaching is necessary to produce a light-colored product. The major yield loss occurs during the purification process.

U.S. Pat. No. 3,521,827 discloses a preparation of SPE by means of a solvent-free interesterification using phenyl esters. However, phenol is liberated during the reaction. Since phenol is extremely toxic and caustic, it contaminates the product and is very difficult to separate. Accordingly, this process did not prove satisfactory for synthesis of SPEs for the food industry. U.S. Pat. No. 3,963,699 calls for solvent-free transesterification involving heating a mixture of the polyol containing four hydroxyls, fatty acid lower alkyl ester, and alkali metal fatty acid soap in presence of a basic catalyst to form a homogenous melt, and subsequently adding to the reaction product of that heated mixture excess fatty acid lower alkyl esters to obtain the SPE.

U.S. Pat. No. 4,034,083 also to Proctor and Gamble discloses fortification of the SPEs with fat-soluble vitamins to form pharmaceutical compositions for treating or preventing hyper-colesterolemia in animals, and for use in low calorie foods. This mixture is required because eating SPE causes vitamin depletion as noted above.

U.S. Pat. No. 3,818,089 indicates that the $C_{12}$–$C_{18}$ ether analogs of glycerides, glycerine alkyl ethers are not digestible.

As shown in C. U. Werl et al, *Food Cosmet. Toxicol.*, 9 (1971) p. 479, monopropylene glycol (MPG) can be ingested with no harmful effects. It is metabolized by the same metabolic pathways used by carbohydrates. MPG is currently used as a humectant in shredded coconut and in moist cake mixes. Ethylene oxide and propylene oxide-based food additives, such as propylene glycol mono-stearate, are recognized food additives, with allowable limits being prescribed by code.

Booth, A., and Gros, A., in a paper entitled *Caloric Availability and Digestibility of New-Type Fats*, Journal of the American Oil Chemists Society, Vol. 40, October 1963, pp. 551–553, disclose that in rat feeding studies amylose palmitate, amylose stearate and amylose oleate are only 17–29% digested. A related prior paper of Gros, A., and Feuge, R., entitled *Properties of the Fatty Acid Esters of Amylose*, Journal of the American Oil Chemists Society, Vol. 39, January 1962, pp. 19–24 discloses that these esters do not have sharp melting points and are extremely viscous when melted. The densities were somewhat greater than those of corresponding free fatty acids and glycerides. While the interest was for use as dip-type coatings in both foods and non-foods, no information appears to be available concerning the ability of these compounds to mimic sensory and functional properties of triglyceride fats in foods.

Mangold and Paltauf extensively reviewed ether lipids in their book *Ether Lipids*, Academic Press 1983. They report that trialkyl glycols having long alkyl chains are not hydrolyzed or absorbed when fed to rats. These long chain trialkylated glycols are reportedly non-toxic and do not interfere with absorption of fats and fat soluble vitamins. However, they are oxidized much more easily than normal fats having comparable acyl chains, so stability appears to be a problem. Further, these compounds are difficult and expensive to prepare.

Canadian patent 1,106,681 issued to Swift and Company in 1981 relates to dialkyl glycerol ethers which are absorbed only in small amounts when fed to rats. Blends are said to exhibit the physical and organoleptic properties of conventional fats.

U.S. Pat. No. 2,962,419 discloses esters of neopentyl type alcohols such as pentaerythritoltetracaprylate. The alcohols contain from 1–8 hydroxyl radicals and include at least one neopentyl nucleus while the fatty acids contain at least four carbon atoms. They were shown to be non-hydrolyzable by pancreatic lipase. Rats fed with these esters had lower levels of lipids in their serum. However, in demand feeding studies, rats which received these neopentyl alcohol esters ate more food than the control rats and thus there was no difference in weight gain among the two groups. Accordingly, it is possible that fat craving is stimulated by these compounds rather than satisfied.

Retrofats are esters of fatty alcohols with tricarboxylic acids. It is reported that they are not hydrolyzed by pancreatic lipase and thus may have potential as non-absorbable fat substitutes. However, increased stool bulk resulting from ingestion of the non-absorbable retrofats is reported to be a potential drawback.

Alkyl esters, such as dodecyl ester of 2,3-ditetradecyloxypropionic acid have been suggested as a fat substitute but were found to be metabolized and absorbed in in vivo rat study experiments. The alkyl ester group was split off first, followed by the alkyl ether groups.

As reported in JACS, Vol. 8 (1958) pp. 6338 ff and JAOCS, Vol. 36 (1959) pp. 667 ff, the USDA has synthesized a number of diglyceride esters of short chain dibasic acids for potential application in foods. Distearin glyceride esters of dicarboxcylic acids were found to be poorly digested and utilized by rats. Distearin adipate was almost completely non-digested while adipostearin was only 58% digested in rat feeding trials. In contrast, the oleostearin and dolein esters of dicarboxylic acids were more digestible and utilized. The symetrical diglyceride esters of fumaric, succinic and adipic acids are more viscous than cottonseed oil and coconut oil. These may have use as pan greases, slab dressings or surface coatings for foods.

U.S. Pat. No. 3,579,548 to Procter and Gamble in 1971 discloses uses of triglyceride esters of alpha-branched carboxylic acids as low calorie fats. These esters exhibited a coefficient of absorbability ranging from about 0–50 as compared to 90–100 for ordinary triglycerides. It is postulated that the alphabranched carboxylate structure prevents the compounds from being hydrolyzed by pancreatic enzymes. Proposed uses are as fat replacements in salad oil, mayonnaise, margarine and dairy products.

Polyoxyethylene stearate is an emulsifying agent with fat like properties that yields only 4.2 kcal/gram when ingested. The molecule is hydrolyzed to stearic acid which is metabolizable, and to polyoxyethylenediol which is excreted unchanged. The use of fat-like emulsifying agents as low calorie fat substitutes has been suggested in the literature.

U.S. Pat. No. 3,337,595, issued to Nalco Chemical in 1967, discloses a method of producing fatty acid esters of polyoxypropylated glycerol of the formula glycerol (propylene oxide)$_n$(fatty acids)$_m$, which from the molecular weight values in the patent result in n=9–16 and m=1 or 2. These esters are disclosed to be useful for controlling, suppressing and/or preventing foaming of aqueous systems having foaming tendencies in industrial processes. Illustrative types of aqueous systems are cellulosic suspensions involved in the manufacture of paper, sewage disposal systems, detergent containing systems, saponin-containing systems, protein containing systems and the like. 1,2-propylene oxide is adducted on glycerol to produce a polyoxypropylated glycerol (POG) with a molecular weight in the range of 600–1,000. Fatty acid esters are prepared by stoichiometric esterification of the POG with saturated or unsaturated alphatic monocarboxylic acids having chain lengths of 12–22 carbons. The esterification process occurs in the range of 200°–240° C. under a vacuum on the order of 30–50 mm mercury. Specific examples are directed to stearic acid diesters of polyoxypropylated glycerol having a molecular weight of 700. An emulsifier is required in the anti-foaming formulations, the specific examples being directed to polyoxyethylene glycol 400 di-oleate. The monocarboxylic acids used to form the diesters are those having $C_{12-22}$ carbons. There is no specific disclosure of a triester or of complete etherification with propylene oxide. There is also no disclosure of the use of the diester compounds as fat substitutes in food products.

Gibson, U. H., and Quick, Q., in a paper entitled *The Average Molecular Structure of Base-Catalyzed Low-Mole Adducts of Propylene Oxide to Glycerin*, J. Applied Polymer Sci., Vol. 14 (1970) pp. 1059–1067 indicate that with a molar ratio of glycerin (G) to propylene oxide (PO) of 1:3, 63% of the adduct product will have all three hydroxyls propoxylated, with 1:4, 92% are propoxylated, and with a ratio of 1:5 all the original hydroxyls will be propoxylated.

It is clear that there is a great need in the art for improved fat substitutes that are easy to synthesize and do not have the disadvantages of the prior art proposed compounds.

THE INVENTION

Objects

It is among the objects of this invention to provide improved non-digestible fat substitutes comprising esterified epoxide-extended polyols (EEEPs) which may be used alone as cooking oils, fats or waxes, or as part of food compositions, as a partial or total substitute for fats or oils.

It is another object of this invention to provide a non-digestible, non-absorbable, non-caloric fat substitute or fat mimetic useful in food compositions or for the preparation of food.

Another object of this invention is to provide improved, substantially non-digestible fat substitutes or partial substitutes, of the epoxide-extended polyols wherein the epoxylation index is sufficient to prevent a substantial degree of hydrolysis by pancreatic lipase;

It is another object of this invention to provide improved, substantially non-digestible fat substitutes or partial substitutes, of esterified epoxide-extended polyols of the formula $P(OH)_{a+c}(EPO)_n(FE)_b$, wherein the epoxylation index, n, is above about 2, and preferably in the range of 2–8;

It is another object of this invention to provide improved fat substitutes which are peracylated epoxide-extended polyols in which the polyols have 3–8 hydroxyl units;

It is another object of this invention to provide improved fat substitutes comprising acylated epoxide-extended glycerols wherein the epoxides are $C_3$–$C_6$ epoxides;

It is another object of this invention to provide improved fat substitutes comprising acylated propylene oxide-extended glycerols wherein the propoxylation index, n, is above about 2, preferably in the range of 2–8;

It is another object of this invention to provide improved fat substitutes comprising esterified epoxide-extended polyols, and preferably acylated propylene oxide extended glycerols in which the acyl esters are $C_8$–$C_{24}$ compounds and which have an in vitro pancreatic lipase hydrolysis index relative to olive oil of below about 10;

It is another object of this invention to provide acylated epoxide-extended polyols in which the acyl groups are of sufficient size to prevent absorption through the walls of the digestive system, the epoxylation index is sufficiently high to prevent a substantial degree of hydrolysis, and which have good organoleptic properties, and which themselves, and their hydrolysis products, are non-toxic;

It is another object of this invention to provide improved fat substitutes comprising triacylated polypropoxylated glycerols in which the propoxylation index is above about 2 and preferably about 5 or above and the acyl groups are $C_{8-24}$ compounds, preferably $C_{14-18}$, and which have a lipase hydrolysis index of below about 10.

It is another object of this invention to provide methods of producing the fat substitutes of this invention, and preferably which can use naturally available oils such as soybean oil as the source of the glycerol and fatty acid moieties.

It is another object of this invention to provide improved food compositions and products employing the fat substitutes of this invention;

Still further and other objects will be evident from the specification and claims of this application.

SUMMARY

This invention comprises esterified epoxide-extended polyols (EEEPs), methods of preparation thereof, and their use as non-digestible fat substitutes (fat mimetics) having low-caloric food values, which have good organoleptic characteristics, are substantially resistant to intestinal absorption, and do not appreciably hydrolyze in the digestive tract.

The structure of the non-digestible fat substitutes of this invention may be generally characterized as $P(OH)_{a+c}(EPO)_n(RCOOH)_b$, where: $P(OH)$ is a polyol having $a=2-8$ primary hydroxyls and $c=0-8$ secondary plus tertiary hydroxyls, with $a+c$ being in the range of 3-8, EPO is a $C_3-C_6$ epoxide; n is the minimum epoxylation index average number having a value generally equal to or greater than a and is a number sufficient that greater than 95% of the primary hydroxyls of the polyol are converted to secondary or tertiary hydroxyls; and RCOOH is a fatty acid acyl moiety in which R is an alkyl chain of 7 or more carbons, RCOOH preferably being $C_{8-24}$, and b is an average number in the range of $2 < b \leq (a+c)$ Suitable polyols include sugars, glycerides or saccharides which are reacted (etherified) with $C_3-C_6$ epoxides such as propylene oxide, butylene oxide, isobutylene oxide, pentene oxide, and the like to produce epoxide-extended polyols (EEPs) having an epoxylation index minimum of 2, and generally in the range of 2-8. Sugars may be selected from glucose, mannose, galactose, arabinose, xylose, sorbitose, amylose, and the like.

We prefer the triol glycerol, with the resultant formula being:

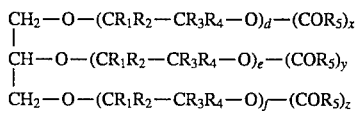

where $d+e+f=n$ as defined above, $x+y+z=b$ as defined above, $R_1=R_2=H$, $R_3=H$ or alkyl, $R_4=$alkyl, and $R_5=C_{7-23}$, preferably $C_{13-17}$. Where propylene oxide is employed as the epoxide $R_1$, $R_2$ and $R_3$ are H, $R_4$ is Me, and $d+e+f$, the epoxylation (propoxylation) index, is 2-8, preferably about 3-5, based on in vitro pancreatic lipase activity relative to olive oil.

The epoxylation index is sufficiently high that the resultant EEEPs are resistant to digestive tract absorption and in vivo digestion by non-specific digestive or lingual lipases. There are two factors to be considered. The first is the epoxylation index for non-digestability, the second is acyl chain length for non-absorption. Where $n=4$ is found to be the suitable in vivo threshold for non-digestability, then the cutoff of the $R_5$ acyl chain length for direct absorption could be as low as $C_7$ (the octanoate ester). This species (using glycerol and propylene oxide) would have an average MW of 702, but since there is a MW distribution in the mixture, species of MW of 586 and 644 would be present.

The esters of tertiary alcohols ($R_3=R_4$ alkyl) or secondary alcohols with bulky substituents can provide good protection from lipase hydrolysis. For example: 1,2-epoxybutane ($R_4$=Et), 2,3-epoxybutane ($R_2=R_4$=Me), both butylene oxide; 1,2-epoxy-3-methylpropane ($R_3=R_4$=Me), isobutylene oxide; 1,2-epoxycyclohexane; and the like, may be used.

It should be understood that the epoxylation index encompasses the mixtures produced by the base catalyzed reaction of the polyol with the epoxide. Thus, where glycerol and propylene oxide are used with $C_{16}-C_{18}$ fatty acids, we have found that as compared to olive oil as a representative substrate having a rate of in vitro lipase reactivity of 100, the propoxylation index of 2 or greater has a hydrolysis rate value on the order of 20-30% of the olive oil. By non-digestability we mean a rate below about 20%, preferably 10%. Thus, food products could be made or cooked in a mixture of natural fats and the synthetic fat mimetics of this invention blended in proportion to provide any predetermined amount of fat caloric value. Where n is 4-5, the relative lipase rate is zero. Depending on the organoleptic qualities desired, the amount of substitution would range from a few percent, to give fractional reduction in caloric value, to entire substitituion for a non-caloric product. Conversely, where the EEEP product has a relative lipase rate close to 20, different amounts of the EEEP fat substitute of this invention could be used in the blend to achieve a desired organoleptic quality or provide a particular cooking use, (e.g., oil vs. fat).

For example, in the case of glycerol and propylene oxide where $a=2$, $c=1$, $n=2$ and $b=3$, the resulting principal compound is triacyl-1,3-di-(2-hydroxypropyl) glycerol:

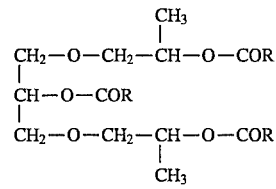

Conversely, where $n=a$, e.g., $n=3$ or more for glycerol, the EEEP compounds of this invention will include polyepoxides in the expoxide-extended interlink between the polyol and the acyl ester moieties. Thus, for propylene oxide, there will be present

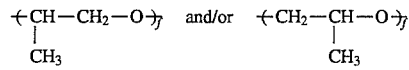

links, where f is 2 or more. The latter linkages predominate. While we do not wish to be bound by theory, we believe that the non-digestibility of the EEEPs of this invention is due to the alcohol ester linkage being secondary rather than primary.

Acylation with one or more $C_{8-24}$ fatty acids produce an end product ester with physical properties ranging from a liquid oil, through fats and greases, and ultimately to waxes. The resultant EEEPs are useful in food formulations and for cooking as they have good mouth feel and characteristics similar to vegetable oils and fats. Being relatively non-absorbable, non-digestible, and non-toxic they may be substituted for natural or processed oils and fats, but have no caloric value.

Examples of such fatty acids are caprylic, capric, lauric, myristic, myristoleic, stearic, palmitic, palmitoleic, rincinoleic, linoleic, linolenic, eleaostearic, arachidic, behenic, erucic, oleic, and/or heptadecanoic acid. The fatty acids can be derived from suitable naturally occurring or synthetic fatty acids and can be saturated or unsaturated, including positional and geometric isomers, depending on the desired physical properties, e.g., liquid or solid, of the fat compound.

Fatty acids per se or naturally occurring fats and oils can serve as the source for the fatty acid component. For example, rapeseed oil provides a good source for $C_{22}$ fatty acid. $C_{16}-C_{18}$ fatty acids can be provided by tallow, soybean oil, or cottonseed oil. Shorter chain fatty acids can be provided by coconut, palm kernel oil, or babassu oils. Corn oil, fish oil, lard, olive oil, palm oil, peanut oil, safflower seed oil, sesame seed oil, jojoba oil and sunflower seed oil, are examples of other natural oils which can serve as the source of the fatty acid component. Among the fatty acids, those that are preferred have from about 14 to about 18 carbon atoms, and are most preferably selected from the group consisting of myristic, palmitic, stearic, oleic, and linoleic. The preferred sources for the fatty acid components are natural fats and oils which have a high content of these fatty acids, e.g., soybean oil, olive oil, cottonseed oil, corn oil, tallow and lard.

Best mode examples of the invention include acylated propoxylated glycerol compound mixtures (APGs) of the formula $[G(PO)_n(FE)_b]$, where G is glycerol (i.e. a=2 and c=1 in the $P(OH)_{a+c}$ formula above), PO is Propylene Oxide, FE is a fatty acid ester moiety, the average propoxylation number n is in the range of 2–5, and b is an average number between above 2 and 3. Suitable fatty acids include mixtures of palmitic acid or heptadecanoic acid with oleic acid. These APGs are resistant to hydrolysis by porcine pancreatic lipase, the dominant enzyme in fat digestion, in vitro.

Even where the fatty acid moieties are hydrolyzed off the EEEPs and APGs of this invention, no outward sign of toxicity of the resulting EEP was observed in our study. Indeed, even propylene glycol which would be released on cleavage of the EEP ether linkage is given GRAS (Generally Recognized as Safe) status by the FDA. Propylene glycol and its derivatives are used at low levels in the food industry, e.g. as solvents for flavors and pharmaceuticals, and in baked goods, salad dressings and sauces.

The process of this invention involves a base (preferably alkali metal) catalyzed reaction of the polyol with the epoxide. As noted in the Gibson and Quick paper, supra, the base catalysis opens the oxirane ring of the propylene oxide in the addition reaction to provide a predominance of secondary hydroxyl groups, on the order of 98% secondary to 2% primary. We prefer, in the case of glycerol to start with a fat such as soybean oil, split it to form glycerol and $RCO_2H$, and separate the glycerol from the fatty acid. This provides the glycerol for the base catalyzed propoxylation addition reaction. The resultant $G(PO)_n$, preferably n=2–5, is then reacted rapidly at high temperature, between about 100° to 200° C. in the presence of paratoluene sulphonic acid (PTSA) with a stoichiometric amount of the soybean oil fatty acid to produce the resultant APGs mixture product. The APGs product can be refined and bleached in a conventional manner, e.g. with alkali and clay, to provide a clean product of low color and low acid value.

DETAILED DESCRIPTION OF THE BEST MODE

The following detailed description is by way of example, not by way of limitation, of the principles of the invention to illustrate the best mode of carrying out the invention.

In this example, the epoxide (EPO) is represented by propylene oxide (PO), the polyol $P(OH)_{a+c}$ by glycerol (G), and the esterified fatty acid acyl moiety (FE) by a mixture of either palmitic or heptadecanoic acids with oleic acid, to produce a food oil/fat substitute/mimetic of the formula $[G(PO)_n(FE)_b]$, where n=2–5 and b=3. With the addition of 5 PO units, all the original polyol (in this example a triol) hydroxyls will have been etherified (in this example propoxylated).

EXAMPLE 1

I. Propoxylated Glycerol Synthesis

A. Catalyst Preparation

A catalyst solution for the propoxylation reaction is prepared to provide 0.25 wt % $K^+$ in 6000 gms final propoxylated product. To prepare the catalyst, 27.59 grams powdered potassium hydroxide and 300 grams glycerol, G, are charged to a 1000 cc rotary evaporation flask and heated under nitrogen at 75°–80° C. with stirring for about one hour. The catalyst goes into solution leaving a cloudy product which is stripped on a rotary evaporator at 60°–70° C./5 mm Hg for one hour to remove water. The theoretical water loss is 12.98 grams. The catalyst solution (314.62 gms) is added to a dry, nitrogen flushed 2-gallon stainless steel stirred reactor.

B. Propoxylation Reaction; 1:3 G:PO

To prepare propoxylated glycerol with three oxypropylene units the initial glycerol charge is 2073.32 gms (i.e., 1773.32 gms charged as free glycerol, and 300 gms added with the catalyst charge). The remaining 1773.32 gms glycerol (MW=92.1 gm/mole) was added to the reactor under a continuous purge with dry nitrogen. The reactor was heated to 70°–75° C. and nitrogen pressure was adjusted to 20 psig. An initial charge of 500 grams propylene oxide, PO, (MW= 58.08 gm/mole) was added to the reactor, and the reaction exotherm was allowed to carry the temperature up to 90° C. After the reaction was initiated, the temperature was adjusted to 90°–95° C. and the remaining dry propylene oxide was added on a pressure demand basis over an 18 hour period. A pressure demand control valve system was used to control the addition rate. A reference pressure was set at 60 psig. If the reactor pressure dropped below this pressure the control valve opened and more propylene oxide was charged to the reactor. When the pressure increased to greater than 60 psig, the valve closed. The propylene oxide was contained in a yoke that was suspended on a weight load cell, thereby permitting the charging of the correct amount of propylene oxide. To prepare propoxylated glycerol with three oxypropylene units the total propylene oxide charge is 3926.68 grams. Since the yoke had a 80 psig nitrogen pressure head, the overall reactor pressure increased to 80 psig when all the propylene oxide was pushed out of the load cell yoke into the reactor. After all the propylene oxide had been added, the reaction mixture was allowed to cook out for an additional 4–6 hours to insure complete reaction.

When the reaction was complete, the product was removed hot from the reactor and was treated with Magnesol$^R$ (4 grams per 250 grams product) for two hours at 100°–110° C. in order to remove the $K^+$ catalyst. The resulting product was vacuum filtered through a Celite® (purified diatomaceous silica) bed at 60°–80° C. to provide the pure oligomeric polyol. Hydroxyl Number, VPO molecular weight, Gel Permeation Chromatography (GPC) analysis, and $^{13}CNMR$ were used to characterize the hydroxy propoxylated glycerols mixture, HPGs. For the HPGs with three oxypropylene units, polydispersity by GPC analysis is 1.19 and the molecular weight calculated from the Hydroxyl Number is 266 gms/mole.

II. Synthesis of APGs (Tri-acylated HPGs)

In a typical synthesis, a solution of 0,035 moles of redistilled acyl chlorides (a mixture of a 1:5 molar ratio of either palmitoyl or heptadecanoyl chloride to oleoyl chloride) in dry chloroform (20 ml) is added dropwise to a stirred solution of 0.01 mole of the HPGs in dry chloroform (20 ml) and dry pyridine (6 ml). The addition is made at room temperature, under an atmosphere of dry nitrogen, and stirring is continued for a further 24 hours. A phase separation occurs in the reaction vessel. At the end of the reaction, the mixture is added to water (500 ml) and extracted several times with petroleum ether (3×500 ml). The combined organic phase is then washed with water (2×500 ml), dilute aqueous HCl (2×500 ml), water (2×500 ml), aqueous potassium bicarbonate (2×500 ml), and then water (2×500 ml), and dried over anhydrous sodium sulphate before evaporation of the solvent. Prior to column chromatography, any free fatty acids still present are methylated with ethereal diazomethane. The crude acylated propoxylated glycerol mixtures (APGs) product is purified by passage down a silicic acid column, eluting with a gradient of diethylether (0 to 100%) in petroleum ether. Overall yields for the APGs synthesis fall in the range of 59–75%. Purity and structure of the APGs product are confirmed by IR and $^1$H NMR spectroscopy, and by Thin Layer Chromatography (TLC). The resultant APG products are all oils at room temperature and generally a very acceptable pale yellow color, but which can be easily bleached or clarified by passing through charcoal. The APGs exhibited reverse viscosity, with the n=1 and n=2.2 products (see Example 2 below) being slightly more viscous than olive oil, and the n=5 and n=8 products slightly less viscous than olive oil. Similarly the n=5 and n=8 did not solidify at 5° C. while the n=1 and n=2.2 exhibited partial crystallization at 5° C. The molecular weight ranges are determined as follows: n=1, 884–1000; n=2.2, 942–1116; n=5, 1058–1290; and n=8, 1058–1348 assuming the trioleoyl derivatives and including 95% of the total mass of the polymeric mixtures. All exhibited organoleptically acceptable properties, having a bland oily mouth feel without being slimy.

III. In Vitro Testing of the APGs (n=1–8) for Digestion by Pancreatic Lipase

EXAMPLE 2

Following the above procedure in Example 1, a number of APG products of the EEEPs of this invention were prepared in which n was varied in the range of from 1–8 by control of the amount of PO in the reaction. 100 mg of the APG fat or oil of the invention to be tested is added to 10 ml of buffer containing 1 mM NaCl, 1 mM $CaCl_2$, 3 mM deoxycholate, 2 mM tris, and 10 g/l of gum arabic. The mixture is vigorously shaken in a capped test-tube, and the emulsion is transferred to the pH stat reaction vessel. The pH is titrated to 8.0 using a Radiometer pH stat (comprising a TTA80 titration assembly, a TTT80 titrator, and ABU80 autoburette and a pHM82 pH meter). Porcine pancreatic lipase (0.1 ml, equivalent to 1000 units of enzyme, at pH 8.0) is added, the pH rapidly re-equilibrated to 8.0, and then the reaction followed over a 20 minute period by autotitration with 50 mM aqueous NaOH. The initial, linear rate is reported as micro moles of NaOH per hour required to keep the pH constant by neutralizing the free fatty acids released by the action of pancreatic lipase.

The results are given below in Table I, expressed as an average of 4 determinations, relative to olive oil as a control (100%), where the EPO is PO and the FE is as in Example I, part II.

TABLE I

| Digestibility (Lipase Activity) | |
|---|---|
| Substrate | Relative Rate* |
| Control: Olive Oil | 100 |
| Invention APGs: $G(EPO)_n(FE)_b$ | |
| n = 0 | 76.2 |
| n = 1 | 46.2 |
| n = 2.2 | 18.9 |
| n = 5 | 0 |
| n = 8 | 0 |

*Average of four determinations.

Based on the above Table I data, at n=3 the lipase hydrolysis rate is about 10%, and at n=4 it is about 5%. We prefer the lipase hydrolysis rate to be below about 10%.

The corresponding acetate adducts of the tested APGs of Table I (n=1, 2.2, 5 and 8) were assayed by Gas Liquid Chromatography (packed column) to show the distribution of polypropylene oxide units in each. The results are shown in Table II:

TABLE II

| | | | Distribution of Polyepoxide Units % Area by GLC (Packed Column) | | | | | | | | | |
|---|---|---|---|---|---|---|---|---|---|---|---|---|
| | | | G:PO | | | | | | | | | |
| Adduct | PG | G | 1:1 | 1:2 | 1:3 | 1:4 | 1:5 | 1:6 | 1:7 | 1:8 | 1:9 | 1:10 |
| $G(PO)_1$ | ND | 31.1 | 46.2 | 19.9 | 2.7 | | | | | | | |
| $G(PO)_{2.2}$ | ND | 2.1 | 22.7 | 40.5 | 28.0 | 5.9 | 0.7 | | | | | |
| $G(PO)_5$ | t | ND | ND | 1.4 | 16.1 | 34.5 | 28.5 | 13.6 | 5.1 | 0.8 | | |
| $G(PO)_8$ | t | ND | ND | ND | 4.9 | 13.3 | 22.3 | 25.8 | 22.6 | 8.3 | 2.7 | ND |

ND = Not detectable
t = trace
PG = propyleneglycol
G = glycol

The above components represent 90% of the mass trace integral, except for $G(PO)_8$ where the value was 67.8% due to presence of unknown additional components, (NOT triacetin). The area % not corrected to give mass or mole % (FID response factors unknown).

Where the APGs product average molecular weight is too low, below about 600–900, it is not useful as a non-digestible fat substitute because it will be directly absorbed in the gut. We believe the non-digestibility of the APGs product of this invention is due primarily to the presence of secondary alcohol ester linkages.

IV. IN VIVO Testing

EXAMPLE 3 FEEDING STUDIES

Sprague-Dawley weanling rats (male) were fed a laboratory chow diet containing 2.5% by weight of two different test compounds: either the n=2.2 composition or the n=5 composition of Example 2, each containing 18% of heptadecanoic acid as a marker, the balance of the fatty acid (acyl) moiety in the EEEP test compound being oleic acid. Total dietary lipid was kept at 10% (by weight) with 2.75% added corn oil, the laboratory chow already containing 4.5% lipid. Also, a known non-digestible marker compound, 1,2-didodecyl-3-hexadecyl glycerol, was added to the diets at 0.25% (by weight) level.

The feeding trial continued for three weeks, during which time rat body weight gain increased at a rate equal to that of control animals. No outward signs of toxicity were observed. Feces were collected and analysed for lipid content, using a GLC method based on heptadecanoic acid and 1,2-didodecyl-3-hexadecylglycerol markers. The data show the following percentage recoveries of heptadecanoic acid (HDA) in the feces:

TABLE III

| Test Compounds | Non-Digestability | | |
|---|---|---|---|
| | % HDA as Free Fatty Acid | % HDA Still Esterified | Total Fecal HDA % |
| n = 2.2 | 12 | 6 | 18 |
| n = 5 | 13 | 31 | 44 |

The percentages listed under %HDA as Free Fatty Acids represents the percentage of the test compound that was not absorbed, but the HDA moiety of which was hydrolyzed in the gut or in the feces by digestive enzymes or microbial action. The percentages listed under %HDA Still Esterified indicate the percentage still in original form, not hydrolyzed in gut or feces. The last column shows the total of the two preceeding columns, being the percentage not absorbed or digested.

The data show that the test compounds, particularly the n=5 compounds (pentahydroxypropylglycerol), are suitably resistant to overall digestion, which includes hydrolysis and absorption in the upper intestine of the rat, and some hydrolysis and utilization by the microbial population of the cecum, colon, and feces.

The synthesis above involving propylene oxide can be employed for epoxylation with butylene oxide and isobutylene oxide, to produce the corresponding epoxide extended polyols which are then acylated, preferably peracylated as above-described.

It should be understood that various modifications within the scope of this invention can be made by one of ordinary skill in the art without departing from the spirit thereof. We therefore wish our invention to be defined by the scope of the appended claims as broadly as the prior art will permit, and in view of this specification if need be.

We claim:

1. An esterified propylene oxide-extended glycerol suitable for use as a fat substitute having the formula

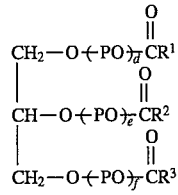

wherein d+e+f is at least 2, PO is oxypropylene, greater than 95% of the ester linkages are secondary alcohol ester linkages, and

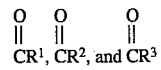

are the same or different and are $C_8$–$C_{24}$ fatty acid acyl moieties with at least one fatty acid acyl moiety selected from the group consisting of $C_8$–$C_{24}$ unsaturated fatty acids.

2. The esterified propylene oxide-extended glycerol of claim 1 wherein d+e+f is from 2 to 8.

3. The esterified propylene oxide-extended glycerol of claim 1 wherein at least one fatty acid acyl moiety is selected from the group consisting of oleic acid, linoleic acid, linolenic acid, palmitoleic acid, ricinoleic acid, myristoleic acid, and erucic acid.

4. The esterified propylene oxide-extended glycerol of claim 1 having a molecular weight of at least 600.

5. The esterified propylene oxide-extended glycerol of claim 1 having an in vitro porcine pancreatic lipase hydrolysis rate value of less than 20% of the rate value of olive oil.

6. The esterified propylene oxide-extended glycerol of claim 1 wherein at least one fatty acid acyl moiety is behenic acid.

7. The esterified propylene oxide-extended glycerol of claim 1 wherein the $C_8$–$C_{24}$ fatty acid acyl moieties are selected from the group consisting of corn oil fatty acids, rapeseed oil fatty acids, palm oil fatty acids, sesame oil fatty acids, olive oil fatty acids, peanut oil fatty acids, safflower seed oil fatty acids, soybean oil fatty acids, cottonseed oil fatty acids and mixtures thereof.

8. An esterified propylene oxide-extended glycerol suitable for use as a fat substitute having the formula

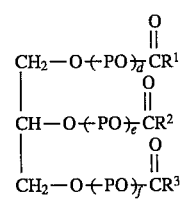

wherein d+e+f is from 2 to 8, PO is oxypropylene, greater than 95% of the ester linkages are secondary alcohol ester linkages, and

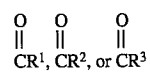

are the same or different and are $C_8$–$C_{24}$ fatty acid acyl moieties with at least one fatty acid acyl moiety selected from the group consisting of $C_8$–$C_{24}$ unsaturated fatty acids.

9. The esterified propylene oxide-extended glycerol of claim 8 wherein d+e+f is from 3 to 5.

10. The esterified propylene oxide-extended glycerol of claim 8 wherein at least fatty acid acyl moiety is selected from the group consisting of linoleic acid, linolenic acid, palmitoleic acid, oleic acid, myristoleic acid, and erucic acid.

11. The esterified propylene oxide-extended glycerol of claim 8 wherein at least one fatty acid acyl moiety is oleic acid.

12. The esterified propylene oxide-extended glycerol of claim 8 having a molecular weight of at least 900.

13. The esterified propylene oxide-extended glycerol of claim 8 having an in vitro porcine pancreatic lipase hydrolysis rate value of less than 10% of the rate value of olive oil.

14. The esterified propylene oxide-extended glycerol of claim 9 wherein the $C_8$–$C_{24}$ fatty acid acyl moieties are selected from the group consisting of rapeseed oil fatty acids, corn oil fatty acids, sesame seed oil fatty acids, olive oil fatty acids, peanut oil fatty acids, safflower seed oil fatty acids, sunflower seed oil fatty acids, soybean oil fatty acids, cottonseed oil fatty acids and mixtures thereof.

* * * * *